(12) United States Patent
Hofmann et al.

(10) Patent No.: US 7,938,585 B2
(45) Date of Patent: May 10, 2011

(54) RADIAL ANTIFRICTION BEARING, ESPECIALLY SINGLE-ROW GROOVED ANTIFRICTION BEARING

(75) Inventors: Heinrich Hofmann, Schweinfurt (DE);
Horst Doppling, Herzogenaurach (DE);
Andreas Bohr, Herzogenaurach (DE);
Rainer Eidloth, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 379 days.

(21) Appl. No.: 12/096,766

(22) PCT Filed: Dec. 5, 2006

(86) PCT No.: PCT/DE2006/002153
§ 371 (c)(1),
(2), (4) Date: Jul. 22, 2008

(87) PCT Pub. No.: WO2007/065414
PCT Pub. Date: Jun. 14, 2007

(65) Prior Publication Data
US 2008/0310786 A1    Dec. 18, 2008

(30) Foreign Application Priority Data
Dec. 10, 2005    (DE) .......................... 10 2005 059 033

(51) Int. Cl.
*F16C 33/46*    (2006.01)
(52) U.S. Cl. ....................... 384/574; 384/523
(58) Field of Classification Search .......... 384/523–534, 384/572–580, 568, 450, 565, 491
See application file for complete search history.

(56) References Cited

U.S. PATENT DOCUMENTS

| 1,438,654 | A | * | 12/1922 | Leon | 384/574 |
| 1,766,440 | A | * | 6/1930 | Leon | 384/558 |
| 1,871,149 | A | * | 8/1932 | Brown | 384/574 |
| 3,620,585 | A | * | 11/1971 | Anderson et al. | 384/491 |
| 3,644,006 | A | * | 2/1972 | Feuillat et al. | 384/560 |
| 3,905,660 | A | * | 9/1975 | Fletcher et al. | 384/544 |
| 4,741,632 | A | * | 5/1988 | Jacobson | 384/491 |
| 5,234,274 | A | * | 8/1993 | Honda et al. | 384/574 |
| 5,735,614 | A | * | 4/1998 | Isogawa | 384/476 |
| 6,682,224 | B2 | * | 1/2004 | Ooitsu et al. | 384/527 |
| 2009/0097793 | A1 | * | 4/2009 | Hofmann et al. | 384/491 |
| 2009/0180724 | A1 | * | 7/2009 | Hofmann et al. | 384/491 |

FOREIGN PATENT DOCUMENTS

| DE | 168499 | 2/1903 |
| DE | 4334195 | 3/1994 |

* cited by examiner

*Primary Examiner* — Thomas R Hannon
(74) *Attorney, Agent, or Firm* — Lucas & Mercanti, LLP

(57) ABSTRACT

A radial antifriction bearing which has an outer bearing ring, an inner bearing ring and a multitude of rollers, arranged between the bearing rings and held by a bearing cage. The rollers are configured as spherical disks that each have two parallel lateral surfaces which are symmetrically flattened from a basic spherical shape. The bearing cage has cage pockets in which the rollers are axially guided between the bearing rings via two low-friction point contacts between the center areas of their lateral surfaces and the longitudinal webs of the cage pockets. The rollers have a defined degree of freedom for tilt movements exerted at an angle to the running direction and a defined degree of freedom for self-adjustment to the pressure angle of the radial antifriction bearing.

8 Claims, 3 Drawing Sheets

RADIAL ANTIFRICTION BEARING, ESPECIALLY SINGLE-ROW GROOVED ANTIFRICTION BEARING

FIELD OF THE INVENTION

The invention relates to a radial rolling bearing which can be implemented particularly advantageously on single-row grooved rolling bearings in motor vehicle transmissions, within the secondary drive of internal combustion engines or in electric brakes.

BACKGROUND OF THE INVENTION

It is generally known to a person skilled in the art of rolling bearings that single-row grooved ball bearings are rigid radial rolling bearings which cannot be dismantled and which are distinguished, above all, in that their radial and axial carrying capacity are equally high, and in that, because of their low friction, they have the highest rotational speed limits of all types of bearings. These grooved ball bearings have been known for a long time and consist essentially of an outer bearing ring and of an inner bearing ring and also of a number of balls which are arranged as rolling bodies between the bearing rings and which are guided at uniform distances from one another in each case in groove-shaped ball raceways in the inside of the outer bearing ring and in the outside of the inner bearing ring by means of a bearing cage. Radial ball bearings are filled with the balls in this case by means of the eccentric mounting method which became known from DE 168 499 and in which the two bearing rings are arranged eccentrically to one another, and the free space thereby occurring between the bearing rings is filled with the balls which are finally distributed at a uniform distance from one another on the pitch circle of the two ball raceways.

In practice, however, it has been shown that grooved ball bearings of this type nevertheless have limits in terms of the carrying capacity of the bearing on account of the small maximum installable number of balls which depends on the dimensions of the inner and of the outer bearing ring and on the ball diameter. In the past, therefore, a multiplicity of solutions were proposed, by means of which an increase in the carrying capacity of grooved ball bearings was to be achieved by means of an increase in the number of balls.

Such a possibility for increasing the number of rolling bodies on a radial rolling bearing became known, for example, from DE 43 34 195 A1. However, in this radial rolling bearing, designed per se as a single-row grooved ball bearing, the rolling bodies are not formed by balls, but by what are known as spherical disks which are formed with two side faces flattened symmetrically from a basic spherical shape and arranged parallel to one another. The width of these spherical disks between their side faces is in this case designed to be smaller than the distance between the inside of the outer bearing ring and the outside of the inner bearing ring, so that, when the bearing is being filled, the spherical disks can be introduced axially with respect to the bearing through the distance between the inner ring and outer ring into the bearing and can then be rotated through 90° into the raceways of the bearing rings. Since smaller distances between the individual rolling bodies can be achieved by means of this mounting method, therefore, overall, a higher number of rolling bodies can be introduced into the radial rolling bearing. In order, however, to avoid mutual contact and an automatic twisting of the rolling bodies transversely with respect to the running direction when the bearing is in operation, these rolling bodies, too, are held at uniform distances from one another and guided axially in a bearing cage. One of the proposed cage versions is in this case a bearing cage which is assembled from two ring halves and in which each of the ring halves has incorporated into it depressions which each correspond to the number of spherical disks and which engage into complementary centric depressions in the side faces of the spherical disks. The depressions in the side faces of the spherical disks are in this case connected to one another by means of a centric through bore through which the two ring halves are connected to one another by means of rivets, so that the spherical disks are fixed firmly with respect to one another in the circumferential direction. Between the depressions, the two ring halves of the bearing cage have in each case portions which run straight along the side faces of the spherical disks and by means of which in combination with the rivets serving as rolling axes of the spherical disks, an automatic twisting of the rolling bodies transversely with respect to their running direction is also avoided.

It has proved, however, to be a disadvantage that a bearing cage designed in this way has not taken into account the overall kinematic behavior, occurring under different bearing loads, of the rolling bodies designed as spherical disks, and therefore this bearing cage seems to be unsuitable for such special rolling bodies. Thus, for example, it was found that spherical disks, as rolling bodies in radial rolling bearings, run in a stable manner in their rolling body raceways, without wrenching movements, at higher rotational speeds and under uniform load, because of the gyroscopic effect which occurs, and do not require any axial guidance by the bearing cage. If, however, the bearing rotational speed falls below a permissible minimum rotational speed, a wobble effect, as it is known, occurs, in which the spherical disks tend to roll in a wavy manner in their raceways transversely with respect to the running direction. In this case, contact occurs between the raceway edges of the spherical disks and the straight portions of the two ring halves of the bearing cage, which generates frictional heat and causes a rise in the operating temperature in the radial rolling bearing. The friction between the spherical disks and the bearing cage may in this case become so high that, due to the frictional heat occurring, the permissible operating temperature of the bearing is overshot and the required lubricating film between the spherical disks, the bearing cage and the bearing rings breaks away locally or the lubricant is partially burnt, thus resulting in the destruction of the bearing cage and in the premature failure of the bearing. It was likewise possible to ascertain that, in such a bearing cage, a similar effect likewise leading to the destruction of the bearing cage and to the failure of the bearing occurs in that the spherical disks, by being clamped between the two ring halves on the rivets of the bearing cage, have no possibility of not being able to orientate themselves with the respective pressure angle of the radial rolling bearing in the event of a mixed radial and axial load on the radial rolling bearing. In the endeavor of the spherical disks to orientate themselves automatically with the pressure angle of the radial rolling bearing under such loads on the radial rolling bearing, there is likewise contact of the side faces of the spherical disks with the straight portions of the ring halves of the bearing cage and also contact of the centric through bore in the spherical disks with the rivets of the bearing cage, so that under such conditions, too, excessive frictional heat has been generated in the radial rolling bearing. Finally, a bearing cage of this type for spherical disks has also proved to be a disadvantage in terms of the production costs of radial rolling bearings equipped with such bearing cages, since its manufacture and, in particular, by means of rivets, its mounting which is to take place in the equipped bearing, are relatively complicated.

OBJECT OF THE INVENTION

Proceeding from the expounded disadvantages of the known prior art, therefore, the object on which the invention is based is to conceive a radial rolling bearing, in particular a grooved rolling bearing, which is designed with a bearing cage which can be produced simply and cost-effectively and, on the one hand, which ensures an axial guidance of the rolling bodies designed as spherical disks and, on the other hand, by means of which, even at low bearing rotational speeds and/or in the case of a mixed axial and radial bearing load, a contact generating frictional heat can be avoided between the spherical disks and the bearing cage.

DESCRIPTION OF THE INVENTION

According to the invention, this object is achieved in that, for a radial rolling bearing, the bearing cage has for each rolling body individual cage pockets which surround each rolling body along a pitch circle line and in which the rolling bodies, via two low-friction point contacts between the center region of their side faces and the longitudinal webs of the cage pockets have axial guidance between the bearing rings and have a defined degree of freedom for tilting movements occurring transversely with respect to the running direction and a defined degree of freedom for automatic orientation with respect to the pressure angle of the radial rolling bearing.

Preferred refinements and advantageous developments of the radial rolling bearing designed according to the invention are described in the subclaims.

In one aspect of the invention there is provision for the center region of the side faces of the rolling bodies to be formed either by centric depressions incorporated into the side faces or by centric recesses incorporated into the side faces. If the rolling bodies are designed with centric depressions, these are preferably designed in the form of circular shallow troughs, whereas, if the rolling bodies are designed with centric recesses, they are preferably formed by shallow annular grooves which run around the rolling body axis. These depressions or recesses have, above all, the advantage that the mass center of gravity of the rolling bodies is displaced radially outward toward their running surfaces and therefore the running properties of the rolling bodies are substantially improved.

In another aspect of the invention, if the side faces of the rolling bodies have centric depressions designed as circular troughs, then a further feature of the radial rolling bearing designed according to the invention is that the point contacts provided for the axial guidance of the rolling bodies, between the center region of the side faces and the longitudinal webs of the cage pockets can be produced via two cone apices incorporated along the longitudinal center into the longitudinal webs. The cone apices project axially into the centric depressions in the side faces of the rolling bodies and are operatively connected to the planar bottom of the depressions in the case of guidance, but, when the bearing is in operation, the cone apices have no permanent contact with the bottom of the depressions. Furthermore, it has proved advantageous to design the cone apices to be rounded at their ends, in order to prevent a premature wear of these cone apices.

In a further aspect of the invention, if, by contrast, the rolling bodies have centric recesses designed as annular grooves in their side faces, it is alternately also possible to produce the point contacts, provided for the axial guidance of the rolling bodies, between the center region of the side faces and the longitudinal webs of the cage pockets via two cone apices integrally formed onto the rolling bodies. The cone apices each project axially out of the centric recesses in the side faces of the rolling bodies and are operatively connected to a planar longitudinally central region of the longitudinal webs of the cage pockets in a guidance situation, but likewise have no permanent contact with the longitudinal webs and are likewise designed to be rounded at their ends in order to avoid wear.

Furthermore, in yet another aspect of the invention, the transverse webs of the cage pockets, which are curved according to the longitudinal and transverse radii of the running surfaces of the rolling bodies, extend beyond the running surfaces on both sides in such a way that the longitudinal webs of the cage pockets are connected to the transverse webs via rounded transitional regions and are arranged at a distance from the side faces of the rolling bodies. The design of the transverse webs of the cage pockets in which the transverse webs extend beyond the running surfaces of the rolling bodies has the effect that the rolling bodies have in the running direction, on both sides, a degree of freedom of an angle of about 3° to 7° which is limited by the transitional regions to the longitudinal webs of the cage pockets and by means of which, in the event of tilting movements of the rolling bodies occurring transversely with respect to the running direction below a permissible minimum rotational speed, a contact generating frictional heat is avoided between the spherical disks and the bearing cage. By contrast, the longitudinal webs of the cage pockets which are arranged at a distance from the side faces has the advantage that the rolling bodies at the same time have, on both sides, an axial degree of freedom of an angle of about 12° to 18° which is limited by the upper and lower edges of the longitudinal webs and by means of which the rolling bodies can orient themselves automatically with respect to the pressure angle of the radial bearing under radial and axial bearing load.

As further preconditions for implementing the two above-mentioned degrees of freedom for the rolling bodies, in an expedient development of the radial rolling bearing designed according to the invention, it is also proposed, furthermore, that the pitch circle of the bearing cage is smaller than the pitch circle of the radial rolling bearing and that the longitudinal webs of the cage pockets have a maximum height of 35% of the diameter of the rolling bodies. Since the pitch circle of the bearing cage is smaller than the bearing pitch circle, the rolling bodies are therefore surrounded below their longitudinal axes by the cage pockets, so that the rolling bodies, in conjunction with the low height of the longitudinal webs of the cage pockets and the above-described design of the cage pockets, have sufficient latitude of movement available to be able to adapt themselves, without contact with the bearing cage, to the bearing load prevailing in each case. The rolling body width limited by the side faces of the rolling bodies in this case amounts to at least 70% of the diameter of the basic spherical shape of the rolling bodies, since such a width has proved appropriate in practice in terms of the radial and axial carrying capacity of the bearing and corresponds approximately to the contact surface which the balls of conventional grooved ball bearings also have with their raceways in the bearing rings.

Finally, the bearing cage either is formed as a stamped/drawn/embossed part, capable of being produced in a non-cutting manner, from a metal material or as an injection molding from an industrial or high-temperature plastic or alternatively is produced from a composite fiber plastic consisting of a fabric reinforcement and resin matrix. As regards the metal materials above all, steel, brass or aluminum have proved to be suitable, by means of which the bearing cage can additionally be coated completely or to a limited extent at its contact points with the rolling bodies with functional layers consisting of hard material, chrome iron, oxide ceramics or molybdenum or can be injection-molded around with an industrial plastic. By contrast, appropriate industrial plastics for the bearing cage are PA 66 or PA 46 with or without inlays of glass fiber, while, for example, PAEK, PEEK, TPI or PAI with suitable additives or inlays of glass fiber can be used as high-temperature plastics. The materials have proved to be particularly cost-effective in terms of their procurement and, furthermore, make it possible to use cost-effective manufacturing methods for the bearing cage, so that radial bearings designed with bearing cages of this type can, overall, be produced at low production costs.

The radial rolling bearing designed according to the invention thus has the advantage, as compared with the radial rolling bearings known from the prior art, that, by the bearing cage being designed with cage pockets in which the rolling bodies are axially guided solely by two point contacts, it takes into account the kinematic conditions in such a radial bearing to an extent such that it has a first degree of freedom, by means of which the wobbling movements, occurring below a permissible minimum rotational speed, or tilting movements, occurring transversely with respect to the running direction, of the rolling bodies no longer lead to a contact of the rolling bodies with the bearing cage and therefore no longer to frictional heat or to an inadmissible rise in the operating temperature of the radial rolling bearing. At the same time, by virtue of their point contact guidance in the cage pockets, the rolling bodies have a sufficient second degree of freedom in the axial direction, by means of which they can orientate themselves automatically with respect to the pressure angle of the radial rolling bearing present in each case under radial and axial bearing load, without likewise coming into contact with the bearing cage. Furthermore, such a bearing cage has also proved to be advantageous in terms of low production costs, since it is set up in a structurally simple way and can be produced from cost-effective materials and also by means of cost-effective manufacturing methods.

BRIEF DESCRIPTION OF THE DRAWINGS

A preferred embodiment of the radial rolling bearing designed according to the invention is explained in more detail below with reference to the accompanying drawings in which.

DETAILED DESCRIPTION OF THE DRAWINGS

Figure 1:
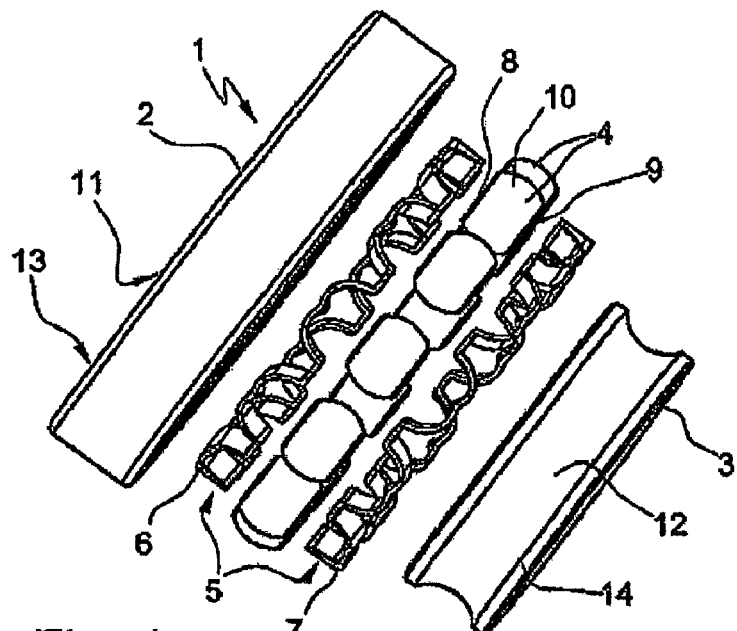
FIG. 1 shows a three-dimensional exploded illustration of a radial rolling bearing designed according to the invention.

It may be gathered clearly from the exploded illustration according to FIG. 1 that a radial rolling bearing 1 designed as a single-row grooved rolling bearing consists essentially, in a similar way to known grooved ball bearings, of an outer bearing ring 2 and of an inner bearing ring 3 and also of a multiplicity of rolling bodies 4 arranged between these bearing rings 2, 3. The rolling bodies 4 are in this case formed, as can be seen clearly, by what are known as spherical disks which each have two side faces 8, 9 flattened symmetrically from a basic spherical shape and arranged parallel to one another and roll with their running surfaces 10 in two groove-shaped raceways 11, 12 which are in each case incorporated into the inside 13 of the outer bearing ring 2 and into the outside 14 of the inner bearing ring 3. Furthermore, the rolling bodies 4 are held at uniform distances from one another in the circumferential direction by a bearing cage 5 which is assembled from two ring halves 6, 7 and the design of which is the subject of the following description.

Figure 2:
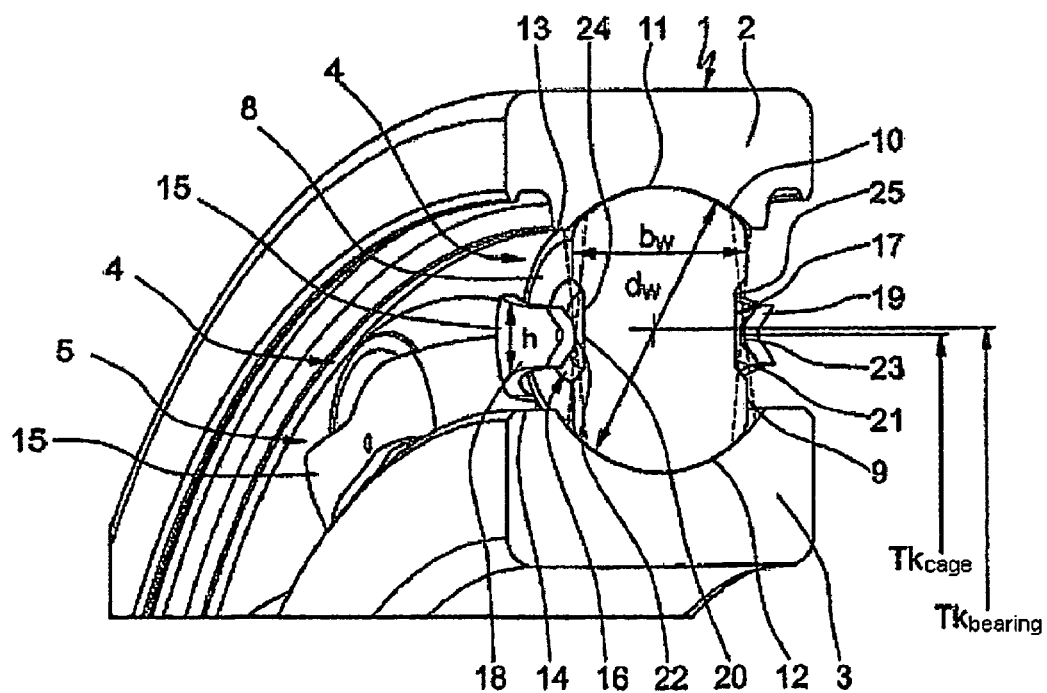
FIG. 2 shows an enlarged three-dimensional illustration of a cross section through a radial rolling bearing designed according to the invention.
Figure 3:
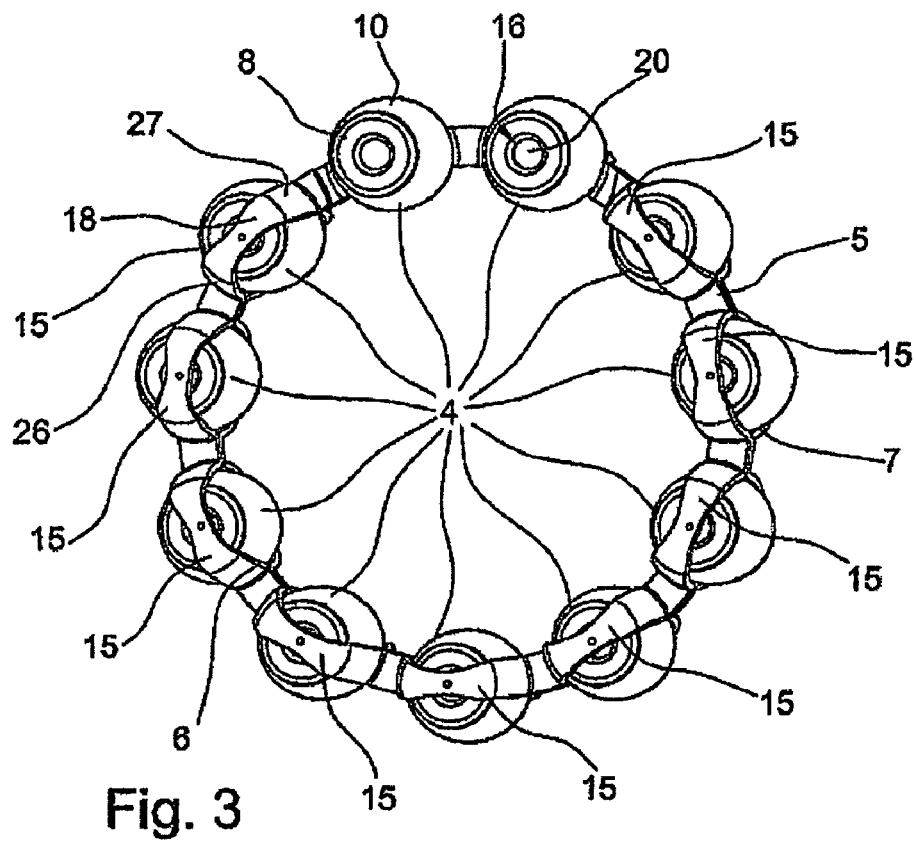
FIG. 3 shows a three-dimensional individual part illustration of the bearing cage of a radial rolling bearing designed according to the invention.

A comparison of FIGS. 2 and 3 makes it clear that, according to the invention, the bearing cage 5 has for each rolling body 4 individual cage pockets 15 which surround these along a pitch circle line and in which the rolling bodies 4 are guided axially between the bearing rings 2, 3 via two low-friction point contacts between the center regions 16, 17 of their side faces 8, 9 and the longitudinal webs 18, 19 of the cage pockets 15. As is also clear from FIG. 4, the center regions 16, 17 of the side faces 8, 9 of the rolling bodies 4 are in this case formed by centric depressions 20, 21 which are incorporated into these side faces 8, 9 and form part of the axial guidance of the rolling bodies and by means of which, at the same time, the mass center of gravity of the rolling bodies 4 is displaced radially outward toward their running surfaces 10.

Figure 4:
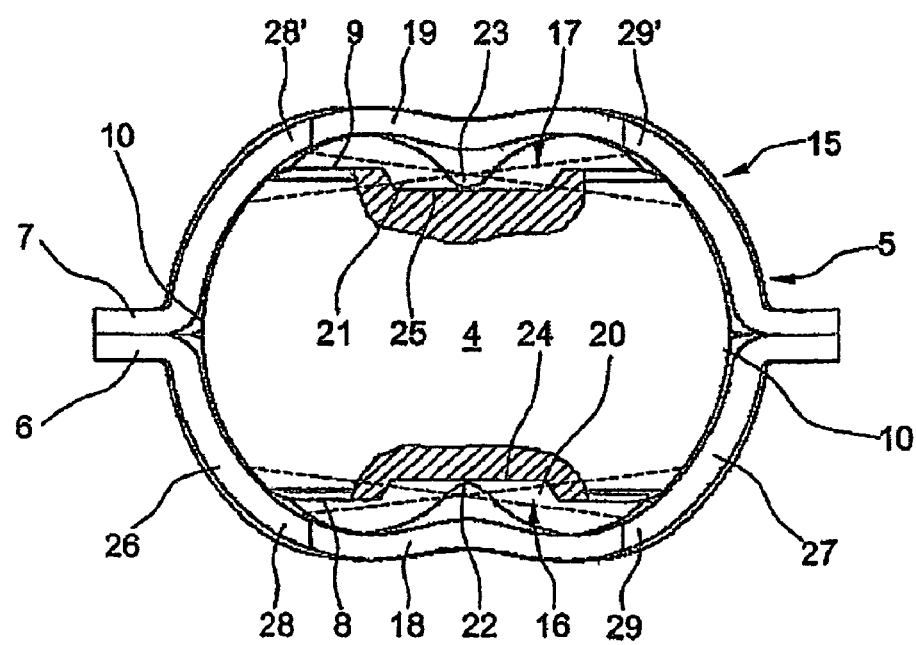
FIG. 4 shows an individual part illustration of a first embodiment of a cage pocket of the bearing cage of a radial rolling bearing designed according to the invention.
Figure 5:
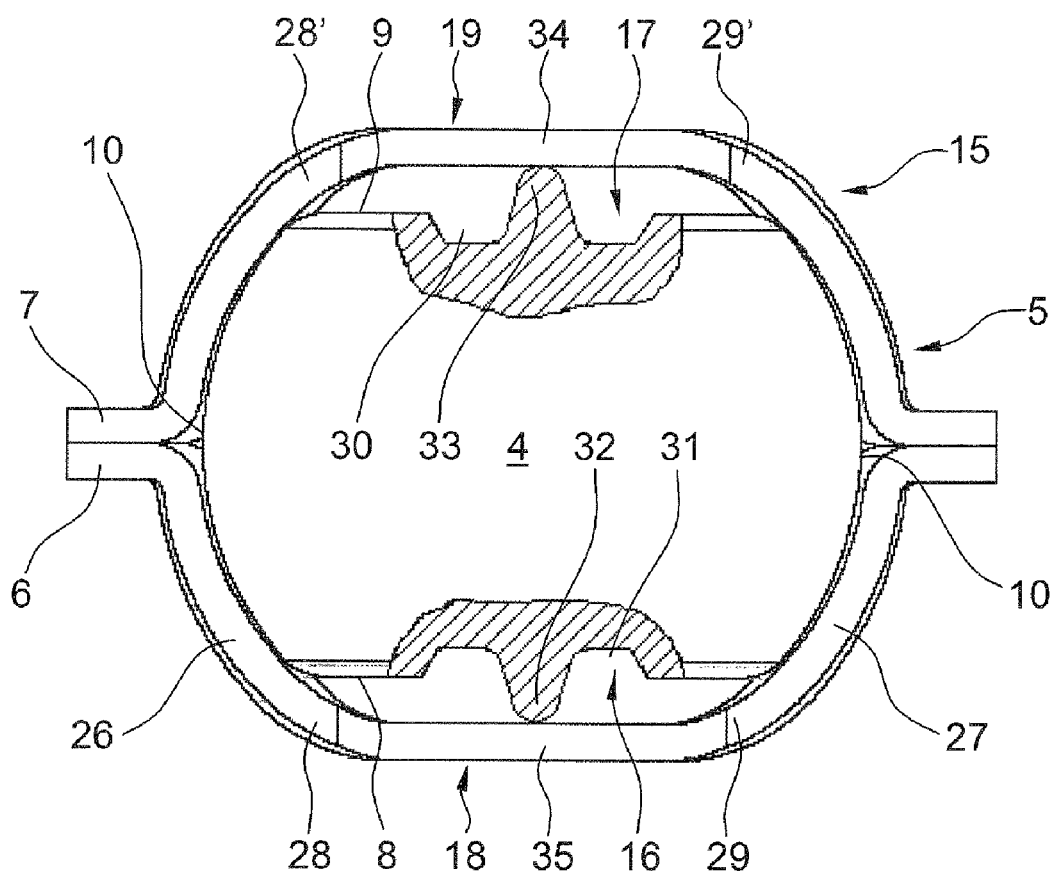
FIG. 5 shows an individual part illustration of a second embodiment of a cage pocket of the bearing cage of a radial rolling bearing designed according to the invention.

Furthermore, it can be seen in FIG. 4 that the point contacts between the center regions 16, 17 of the side faces 8, 9 and the longitudinal webs 18, 19 of the cage pockets 15 are produced via two axial cone apices 22, 23 which are incorporated along the longitudinal center into the longitudinal webs 18, 19 and project in each case into centric depressions 20, 21 in the side faces 8, 9 of the rolling bodies 4 and which are operatively connected to the planar bottom 24, 25 of the depressions 20, 21. However, it is alternatively also possible to produce the point contact between the center regions 16, 17 of the side faces 8, 9 and the longitudinal webs 18, 19 of the cage pockets 15 on the rolling bodies 4, as shown in FIG. 5, via two cone apices 32, 33 projecting axially out of concentric recesses 30, 31 in the side faces 8, 9 of the rolling bodies 4, which apices are operatively in contact with a longitudinally central planar region 34, 35 of the longitudinal webs 18, 19 of the cage pockets 15. The transverse webs 26, 27 of the cage pockets 15, said transverse webs being designed to be curved according to the longitudinal and transverse radii of the running surfaces 10 of the rolling bodies 4, in this case, as can be seen clearly, extend beyond these running surfaces 10 on both sides in such a way that the longitudinal webs 18, 19 of the cage pockets 15, said longitudinal webs being connected between the transverse webs 26, 27 to these via rounded transitional regions 28, 28', 29, 29', are arranged at a distance from the side faces 8, 9 of the rolling bodies 4.

The design of the transverse webs 26, 27 of the cage pockets 15 in which said transverse webs extend beyond the running surfaces 10 of the rolling bodies 4 in this case has the effect, on the one hand, that the rolling bodies 4 have on both sides a degree of freedom of about 3° to 7°, limited by the transitional regions 28, 28', 29, 29' to the longitudinal webs 18, 19 of the cage pockets 15 and indicated in FIG. 4 by dashed lines, for tilting movements which occur transversely with respect to the running direction. On the other hand, what is achieved by the longitudinal webs 18, 19 of the cage pockets 15 being arranged at a distance from the side faces 8, 9 of the rolling bodies 4 is that the rolling bodies 4 at the same time have on both sides a degree of freedom of about 12° to 18°, limited by the upper and lower edges of the longitudinal webs 18, 19 and indicated in FIG. 2 by dashed lines, for automatic orientation with respect to the pressure angle of the radial bearing 1 under radial and axial bearing load.

Furthermore, it is also illustrated in FIG. 2 that, as a further precondition for the two degrees of freedom mentioned, the pitch circle $Tk_{cage}$ of the bearing cage 5 is smaller than the pitch circle $Tk_{bearing}$ of the radial rolling bearing 1, so that the rolling bodies 4 are surrounded below their longitudinal axes by the cage pockets 15. The longitudinal webs 17, 18 of the cage pockets 15 in this case have a maximum height h of 35% of the diameter $d_w$ of the rolling bodies 4, and the rolling body width $b_w$ limited by the side faces 8, 9 of the rolling bodies 4 amounts to at least 70% of the diameter $d_w$ of the rolling bodies 4.

It may also be gathered, merely in passing, from the drawings that the bearing cage 5 is formed as a stamped/drawn/embossed part, produced in a non-cutting manner, from a steel sheet which is coated, limited to its contact points with the rolling bodies 4 with a wear-reducing functional layer consisting of chrome iron.

LIST OF REFERENCE NUMERALS

1 Radial rolling bearing
2 Outer bearing ring
3 Inner bearing ring
4 Rolling body
5 Bearing cage
6 Ring half of 5
7 Ring half of 5
8 Side face of 4
9 Side face of 4
10 Running surfaces of 4
11 Raceway of 2
12 Raceway of 3
13 Inside of 2
14 Outside of 3
15 Cage pockets
16 Center region of 8
17 Center region of 9
18 Longitudinal web of 15
19 Longitudinal web of 15
20 Depression in 8
21 Depression in 8
22 Cone apex on 18
23 Cone apex on 19
24 Bottom of 20
25 Bottom of 21
26 Transverse web of 15
27 Transverse web of 15
28 Transitional region
28' Transitional region
29 Transitional region
29' Transitional region
30 Recess in 8
31 Recess in 9
32 Apex in 30
33 Apex in 31
34 Planer region on 18
35 Planer region on 19
$Tk_{cage}$ Pitch circle of 5
$Tk_{bearing}$ Pitch circle of 1
h Height of 18, 19
$d_w$ Diameter of 4
$b_w$ Width of 4

The invention claimed is:

1. A radial rolling bearing, comprising:
an outer bearing ring; an inner bearing ring; and a multiplicity of rolling bodies which are arranged between the bearing rings and which are held at uniform distances from one another in a circumferential direction by a bearing cage assembled from two ring halves,
the rolling bodies being formed as spherical disks, which have two side faces flattened symmetrically from a basic spherical shape, which are arranged parallel to one another and which roll with running surfaces in two groove-shaped raceways that are incorporated into an inside face of the outer bearing ring and into an outside face of the inner bearing ring,
wherein the bearing cage has, for each rolling body, individual cage pockets which surround the rolling bodies along a pitch circle line and in which the rolling bodies, via two low-friction point contacts between center regions of the side faces and longitudinal webs of the cage pockets are axially guided between the bearing rings and have a defined degree of freedom for tilting movements occurring transversely with respect to a running direction and a defined degree of freedom for automatic orientation with respect to a pressure angle of the radial rolling bearing,
wherein the center regions of the side faces of the rolling bodies are formed by centric depressions that are incorporated into the side faces, the center regions each having a planer bottom extending radially over a substantial portion of each side face, and by means of the center regions a mass center of gravity of the rolling bodies can be displaced radially outward toward the running surfaces, and
wherein the center regions of the side faces of the rolling bodies and the longitudinal webs of the cage pockets are in contact with each other via axial cone apices which are incorporated along a longitudinal center into the longitudinal webs, protrude into the centric depressions in the side faces of the rolling bodies and are in operative contact with the planar bottom of the depressions only at a point of contact.

2. The radial rolling bearing as claimed in claim 1, wherein the cage pockets have transverse webs, said transverse webs are curved according to the radii of the running surfaces of the rolling bodies and extend beyond the running surfaces on both sides in such a way that the longitudinal webs of the cage pockets are connected to the transverse webs via rounded transitional regions and are arranged at a distance from the side faces of the rolling bodies.

3. The radial rolling bearing as claimed in claim 2, wherein, by the transverse webs of the cage pockets extending beyond the running surfaces of the rolling bodies, the rolling bodies have on both sides a degree of freedom of about 3° to 7°, limited by the transitional regions to the longitudinal webs of the cage pockets, for tilting movements which occur transversely with respect to the running direction.

4. The radial rolling bearing as claimed in claim 2, wherein by the longitudinal webs of the cage pockets being arranged at a distance from the side faces of the roiling bodies, the rolling bodies have on both sides a degree of freedom of about 12° to 18°, limited by upper and lower edges of the longitudinal webs, for automatic orientation with respect to the pressure angle of the radial bearing under radial and axial bearing load.

5. The radial rolling bearing as claimed in claim 1, wherein the bearing cage has a pitch circle which is smaller than a pitch circle of the radial rolling bearing, the longitudinal webs of the cage pockets have a maximum height of 35% of a diameter of the rolling bodies, and a rolling body width is limited by the side faces of the rolling bodies amounting to at least 70% of the diameter of the rolling bodies.

6. The radial rolling bearing as claimed in claim 1, wherein the bearing cage is formed as a stamped, drawn or embossed part, capable of being produced in a non-cutting manner, from a metal material and the bearing cage is coated completely or limited to contact points with the rolling bodies with functional layers consisting of hard material, chrome iron, oxide ceramics or molybdenum or industrial plastic which is injection-molded.

7. The radial rolling bearing as claimed in claim 1, wherein the bearing cage is manufactured by injection molding of an industrial plastic with or without inlays of glass fiber, a high-temperature plastic with suitable additives or inlays of glass fiber, or a composite fiber plastic which has a fabric reinforcement and a resin matrix.

8. A radial rolling bearing, comprising:
an outer bearing ring; an inner bearing ring; and a multiplicity of rolling bodies which are arranged between the bearing rings and which are held at uniform distances from one another in a circumferential direction by a bearing cage assembled from two ring halves,
the rolling bodies being formed as spherical disks, which have two side faces flattened symmetrically from a basic spherical shape, which are arranged parallel to one another and which roll with running surfaces in two groove-shaped raceways that are incorporated into an inside face of the outer bearing ring and into an outside face of the inner bearing ring,
wherein the bearing cage has, for each rolling body, individual cage pockets which surround the rolling bodies along a pitch circle line and in which the rolling bodies, via two low-friction point contacts between center regions of the side faces and longitudinal webs of the cage pockets are axially guided between the bearing rings and have a defined degree of freedom for tilting movements occurring transversely with respect to a running direction and a defined degree of freedom for automatic orientation with respect to a pressure angle of the radial rolling bearing,
wherein the center regions of the side faces of the rolling bodies are formed by centric depressions that are incorporated into the side faces, the center regions each having a planer bottom extending radially over a substantial portion of each side face, and by means of the center regions a mass center of gravity of the rolling bodies can be displaced radially outward toward the running surfaces, and
wherein the center regions of the side faces of the rolling bodies and the longitudinal webs of the cage pockets are in contact with each other via cone apices on the rolling bodies, the cone apices project axially out of centric recesses in the side faces of the rolling bodies and are in operative contact with the planar bottom of the depressions.

* * * * *